United States Patent
Hsu et al.

(10) Patent No.: US 8,691,131 B2
(45) Date of Patent: Apr. 8, 2014

(54) POLYIMIDE FILM

(75) Inventors: Yen-Huey Hsu, Pingjhen (TW); Der-Jen Sun, Pingjhen (TW)

(73) Assignee: Mortech Corporation, Pingjhen (TW)

( * ) Notice: Subject to any disclaimer, the term of this patent is extended or adjusted under 35 U.S.C. 154(b) by 0 days.

(21) Appl. No.: 13/618,670

(22) Filed: Sep. 14, 2012

(65) Prior Publication Data

US 2013/0065038 A1  Mar. 14, 2013

(30) Foreign Application Priority Data

Sep. 14, 2011 (TW) .............................. 100133039 A

(51) Int. Cl.
*B29C 69/02* (2006.01)

(52) U.S. Cl.
USPC .......... 264/216; 264/231; 264/236; 264/288.4

(58) Field of Classification Search
USPC ................................ 264/216, 231, 236, 288.4
See application file for complete search history.

(56) References Cited

U.S. PATENT DOCUMENTS

| | | | | |
|---|---|---|---|---|
| 3,867,500 A * | 2/1975 | Traynor | .................. | 264/216 |
| 4,405,550 A * | 9/1983 | Hungerford | ............... | 264/216 |
| 4,426,486 A * | 1/1984 | Hungerford | ............... | 524/600 |
| 4,428,742 A * | 1/1984 | Deal | ........................ | 493/142 |
| 4,485,056 A * | 11/1984 | Makino et al. | ............... | 264/41 |
| 7,871,554 B2 * | 1/2011 | Oishi et al. | ............... | 264/289.6 |
| 2002/0074686 A1 * | 6/2002 | Yabuta et al. | ............... | 264/176.1 |
| 2008/0038568 A1 * | 2/2008 | Fujihara et al. | ............ | 428/473.5 |
| 2009/0160089 A1 * | 6/2009 | Oishi et al. | ................. | 264/289.6 |
| 2009/0252957 A1 * | 10/2009 | Kasumi et al. | ................ | 428/349 |
| 2012/0308816 A1 * | 12/2012 | Kohama et al. | ............... | 428/354 |

FOREIGN PATENT DOCUMENTS

| | | |
|---|---|---|
| CN | 1933954 | 3/2007 |
| JP | 60-127523 | 7/1985 |
| JP | 02-164592 | 6/1990 |
| JP | 2007-77231 | 3/2007 |
| JP | 2008-115245 | 5/2008 |
| JP | 2009-067042 | 4/2009 |
| JP | 2011-213012 | 10/2011 |
| TW | 538071 | 6/2003 |
| WO | WO 2005/082594 | 9/2005 |

\* cited by examiner

*Primary Examiner* — Christina Johnson
*Assistant Examiner* — Saeed Huda
(74) *Attorney, Agent, or Firm* — Kilpatrick Townsend & Stockton LLP

(57) ABSTRACT

Disclosed herein is a polyimide film having inorganic particles. The polyimide film is 12-250 μm in thickness. The polyimide film includes about 50-90 weight parts of polyimide and about 10-50 weight parts of the inorganic particles. The particle size of each of the inorganic particles is about 0.1 μm to about 5 μm. The polyimide film is characterized in that the thermal expansion coefficient is equal to or less than 30 ppm/° C. in any direction, the difference between two thermal expansion coefficients in two mutually perpendicular directions on the film surface is less than 10 ppm/° C., and the Young's modulus of the polyimide film is greater than 4 GPa in any direction. The dimensional stability of the polyimide film measured by the standard of IPC-TM-650 is less than 0.10% in any direction. A method for manufacturing the polyimide film is disclosed as well.

15 Claims, 4 Drawing Sheets

POLYIMIDE FILM

RELATED APPLICATION

This application claims priority to Taiwan Application Serial Number 100133039, filed Sep. 14, 2011, which is herein incorporated by reference.

BACKGROUND

1. Technical Field

The present disclosure relates to a polyimide film and a method for manufacturing the same. More particularly, the present disclosure relates to a polyimide film having inorganic particles and a method for manufacturing the same.

2. Description of Related Art

The polyimide polymer is widely applied due to the excellent mechanical strength, insulating property and high temperature resistance thereof, such as a flexible printed circuit (FPC) applied in various electronic products. A general FPC is formed by etching a flexible copper clad laminate (FCCL) into conducting lines connecting with various circuit components and then covering a layer of polyimide film (Coverlay) thereon with an adhesion agent. The polyimide film is the most important upstream raw material of FPC.

The FCCL can further be divided into two categories: a three-level flexible copper clad laminate (3L FCCL) and a two-level flexible copper clad laminate (2L FCCL). The 3L FCCL is formed by first producing a polyimide film and then pasting the polyimide film to a copper foil through an adhesion agent. The 2L FCCL is formed by directly coating polyimide glue on a copper foil and then molding through baking.

In the FPC, the polyimide film should be combined tightly with the copper foil, and during the process of manufacturing the FPC the polyimide film and the copper foil should be subjected to high-temperature processes such as coating, stretching, laminating, etching and soldering, so that it is important to consider the dimensional variations of the polyimide film and the copper foil after these processes. Due to the above demands, there is a need to create a polyimide film which has a thermal expansion coefficient close to that of a copper foil and high dimensional stability.

In general, manufacturing of the polyimide film can be further subdivided into three steps. Firstly, a polyamic acid solution is obtained by reacting reactive monomers. Subsequently, the polyamic acid solution is applied onto a supporting steel strip or a roller to be shaped as films, and then is stripped after heating and drying to obtain a polyamic acid film. Finally, the polyamic acid film is heated at a high temperature, so that a polyimide film is formed by imidization of the polyamic acid film. This is a continuous scrolling process. During the imidization, due to shrink and strength of the polyamic acid film caused by the high temperature, the physical property of the resulted polyimide film is anisotropic. For example, the thermal expansion coefficient and the mechanical strength of the film layer at a machine direction (MD) is different from that of the film layer at a transverse direction (TD).

In order to solve the problems above, a bi-axial Stretch technique is developed in the industry, such that the film layers at the MD direction and the TD direction have the same thermal expansion coefficient and mechanical strength. However, a production equipment of the bi-axial Stretch technique is expensive and is not convenient to maintain. Furthermore, two sides of the film layer stretched at the TD direction are fixed through a fixture or a pin and the film layer is suspended. However if the film has a large thickness for example larger than or equal to 125 μm, due to the weight of the film and the variation of the film under heat, it is difficult to support the film only through the fixtures or pins at two sides thereof. Therefore, many in the industry are endeavoring to find ways in which to create an improved polyimide film and a method for manufacturing the same, so as to solve the above problems.

SUMMARY

An aspect of the present disclosure provides a method for manufacturing a polyimide film having inorganic particles, so as to obtain a polyimide film with an isotropic thermal expansion coefficient through a uniaxial stretch manner, and the resulted polyimide film has excellent Young's modulus and good dimensional stability. That is, without using a bi-axial stretch technique, the present disclosure can achieve isotropic thermal expansion coefficients and isotropic dimensional variations in both machine direction and transverse direction. The polyimide film having inorganic particles has an available thickness in a range of 12 μm-250 μm.

The method for manufacturing the polyimide film having inorganic particles includes the following steps: (a) mixing the inorganic particles with a solvent and stirring the same to form a suspending liquid, in which the particle size of each of the inorganic particles is about 0.1 μm to about 5 μm; (b) under stirring, mixing a diamine monomer and a tetracarboxylic dianhydride monomer with the suspending liquid to polymerize the diamine monomer and the tetracarboxylic dianhydride monomer, and thus form a polyamic acid mixture containing the inorganic particles; (c) coating the polyamic acid mixture on a substrate and then performing a drying process to form a dried layer of polyamic acid mixture on the substrate; (d) separating the dried layer of polyamic acid mixture from the substrate to form a polyamic acid mixture film; and (e) uniaxially stretching and heating the polyamic acid mixture film simultaneously to convert the polyamic acid mixture film into the polyimide film.

According to an embodiment of the present disclosure, the inorganic particles in step (a) are selected from the group consisting of mica powder, silicon dioxide powder, talcum powder, ceramic powder, clay powder, kaolinite clay and a combination thereof.

According to another embodiment of the present disclosure, the solvent used in step (a) is selected from the group consisting of N,N-Dimethyl formamide (DMF), Dimethylacetamide (DMAc), Dimethyl sulfoxide (DMSO), N-methyl-2-pyrrolidone (NMP) and a combination thereof.

According to a further embodiment of the present disclosure, the step (b) of mixing the diamine monomer and the tetracarboxylic dianhydride monomer with the suspending liquid includes the steps described below. The diamine monomer is added into the suspending liquid and then dissolves to form a mixture including the diamine monomer. Subsequently, the tetracarboxylic dianhydride monomer is added into the mixture including the diamine monomer.

According to yet a further embodiment of the present disclosure, the stirring time of step (b) is about 4 hours to about 36 hours.

According to still yet a further embodiment of the present disclosure, the molar ratio of the tetracarboxylic dianhydride monomer to the diamine monomer in step (b) is from 0.9:1 to 1.1:1.

According to an embodiment of the present disclosure, the viscosity of the polyamic acid-containing mixture is about 100 poises to about 1000 poises.

According to another embodiment of the present disclosure, the diamine monomer used in step (b) is selected from a group consisting of 1,4 diamino benzene, 1,3 diamino benzene, 4,4'-oxydianiline, 3,4'-oxydianiline, 4,4'-methylene dianiline, N,N'-Diphenylethylenediamine, diaminobenzophenone, diamino diphenyl sulfone, 1,5-naphenylene diamine, 4,4'-diamino diphenyl sulfide, 1,3-Bis(3-aminophenoxy)benzene, 1,4-Bis(4-aminophenoxy)benzene, 1,3-Bis(4-aminophenoxy)benzene, 2,2-Bis[4-(4-amino phenoxy)phenoxy]propane, 4,4'-bis-(4-aminophenoxy)biphenyl, 4,4'-bis-(3-aminophenoxy)biphenyl, 1,3-Bis(3-aminopropyl)-1,1,3,3-tetramethyldisiloxane, 1,3-Bis(3-aminopropyl)-1,1,3,3-tetraphenyldisiloxane, 1,3-Bis(aminopropyl)-dimethyldiphenyldisiloxane and a combination thereof.

According to a further embodiment of the present disclosure, the tetracarboxylic dianhydride monomer used in step (b) is selected from a group consisting of 1,2,4,5-benzene tetracarboxylic dianhydride, 3,3'4,4'-biphenyl tetracarboxylic dianhydride, 4,4'-oxydiphthalic anhydride, benzophenonetetracarboxylic dianhydride, 3,3',4,4'-diphenyl sulfonetetracarboxylic dianhydride, 1,2,5,6-naphthalene tetracarboxylic dianhydride, naphthalenetetracarboxylic dianhydride, bis(3,4-dicarboxyphenyl)dimethylsilane dianhydride, 1,3-bis(4'-phthalic anhydride)-tetramethyldisiloxane and a combination thereof.

According to yet a further embodiment of the present disclosure, the drying process of step (c) is performed in an environment with a temperature from about 120° C. to about 200° C.

According to still yet a further embodiment of the present disclosure, the step (e) of heating the polyamic acid mixture film is performed in an environment at a temperature from about 270° C. to about 400° C.

According to an embodiment of the present disclosure, the uniaxial stretching in step (e) is carried out in a direction parallel to a long side of the polyamic acid mixture film.

According to another embodiment of the present disclosure, the aforementioned inorganic particles are existed in a concentration of 10-50% by weight of the polyimide film.

A further aspect of the present disclosure provides a polyimide film having inorganic particles. The polyimide film is manufactured by a method described in any of the above embodiments. Furthermore, the polyimide film is characterized in that the thermal expansion coefficient is equal to or less than 30 ppm/° C. in any direction on the film surface, the difference between two thermal expansion coefficients in two mutually perpendicular directions on the film surface is less than 10 ppm/° C., and the Young's modulus of the polyimide film is greater than 4 GPa in any direction. The dimensional stability of the resulted polyimide film measured by the standard of IPC-TM-650 is less than 0.10% in any direction.

A further aspect of the present disclosure provides a polyimide film having inorganic particles. The polyimide film includes about 50-90 weight parts of polyimide and about 10-50 weight parts of the inorganic particles. The particle size of each of the inorganic particles is about 0.1 µm to about 5 µm. The polyimide film is characterized in that the thermal expansion coefficient is equal to or less than 30 ppm/☐in any direction on the film surface, the difference between two thermal expansion coefficients in two mutually perpendicular directions on the film surface is less than 10 ppm/° C., and the Young's modulus of the polyimide film is greater than about 4 GPa in any direction. The dimensional stability of the resulted polyimide film measured by the standard of IPC-TM-650 is less than 0.10% in any direction.

According to an embodiment of the present disclosure, the particle size of each of the inorganic particles is about 0.5 µm to about 3 µm.

According to another embodiment of the present disclosure, the inorganic particles are existed in a concentration of 25-38% by weight of the polyimide film.

A further aspect of the present disclosure provides a polyimide film having inorganic particles. The polyimide film does not contact with any metal layer body, and essentially consists of the following substances: about 50 to about 90 weight parts of polyimide; and about 10 to about 50 weight parts of inorganic particles, wherein the particle size of each of the inorganic particles is about 0.5 µm to about 3 µm.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
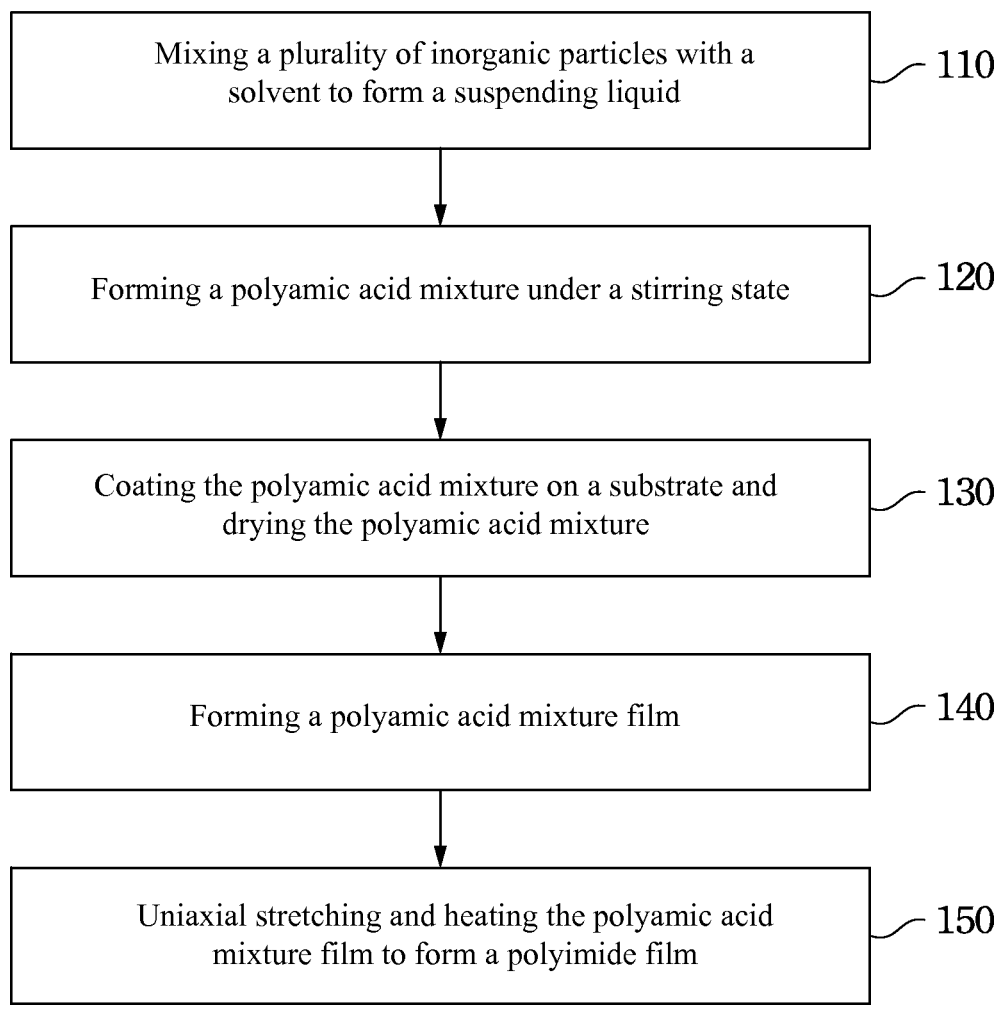
FIG. 1 illustrates a flow chat of a method for manufacturing a polyimide film having inorganic particles according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

FIG. 1 illustrates a flow chat of a method 100 for manufacturing a polyimide film having inorganic particles according to an embodiment of the present disclosure.

In step 110, a plurality of inorganic particles are mixed and stirred with a solvent to form a suspending liquid. In step 110, the inorganic particles are distributed in the solvent by stirring, so as to avoid precipitation and form the suspending liquid. Any method or means which can achieve the aforementioned purposes can be applied in the present disclosure.

The particle size of each of the inorganic particles is about 0.1 µm to about 5 µm. If the particle size of each of the inorganic particles is greater than 5 µm, the resulted polyimide film has a too large surface roughness, which cannot be applied in electronic products. In contrast, if the particle size of each of the inorganic particles is less than 0.1 µm, then in the subsequent steps, these inorganic particles are easy to be agglutinated and thus are not easy to be well distributed, which cause a serious problem for the process. Therefore, in one embodiment, the particle size of each of the inorganic particles is preferably about 0.5 μm to about 3 μm.

In one embodiment, the inorganic particles may for example be mica powder, silicon dioxide powder, talcum powder, ceramic powder, clay powder, kaolinite clay or a combination thereof.

In another embodiment, the solvent may for example be N,N-Dimethyl formamide (DMF), Dimethylacetamide (DMAc), Dimethyl sulfoxide (DMSO), N-methyl-2-pyrrolidone (NMP) or a combination thereof.

In a further embodiment, in consideration of dispersivity, viscosity, and drying in subsequent processes, the weight percentage of the inorganic particles in the suspending liquid may be about 1% to about 20%, and more specifically 3-12%.

In the step 120, under stirring, a diamine monomer and a tetracarboxylic dianhydride monomer are mixed with the suspending liquid to polymerize the diamine monomer and the tetracarboxylic dianhydride monomer, and thus form a polyamic acid mixture containing inorganic particles.

During the polymerization reaction, in order to avoid precipitation of inorganic particles, it is necessary to stir continuously at least at the initial state of the reaction. In particular, after the polymerization reaction proceeding, the viscosity of the whole mixture may be increased by the polyamic acid polymer produced by the polymerization reaction. When the viscosity of the mixture is increased to a certain value, the inorganic particles in the mixture will not be precipitated in a short time. In one embodiment, when the viscosity of the mixture is increased to be in a range from 100 poises to about 1000 poises (i.e., 10,000-100,000 cps), it can be ensured for 7-14 days that no precipitation of the inorganic particles happens in the polyamic acid mixture. Therefore, the time period during which the polyamic acid mixture is stable is sufficient for performing the subsequent steps, which has great benefits for the production scheduling of the manufacturing process.

In one embodiment, in the above-mentioned step of mixing the diamine monomer and the tetracarboxylic dianhydride monomer with the suspending liquid, the diamine monomer is first added into the suspending liquid, and after the diamine monomer is dissolved, the tetracarboxylic dianhydride monomer is slowly added into the mixture containing the dissolved diamine monomer so as to start the polymerization reaction. In this embodiment, the stirring time is about 4 h to about 36 h. The temperature of the polymerization reaction is about 10° C. to about 50° C. Since the polymerization reaction is an exothermic reaction, in one embodiment the polymerization reaction can be performed in a reactor equipped with a temperature controller, and thus the temperature of the polymerization reaction is controlled in an appropriate range, such as from about 20° C. to about 30° C.

The molar ratio of the tetracarboxylic dianhydride monomer to the diamine monomer affects the quality of the resulted polymer. In one embodiment, the molar ratio of the tetracarboxylic dianhydride monomer to the diamine monomer is from 0.9:1 to 1.1:1. In another embodiment, the mole number of the tetracarboxylic dianhydride monomer is less than the mole number of the diamine monomer, so that the quality of the resulted polymer is good. For example, the molar ratio of the tetracarboxylic dianhydride monomer to the diamine monomer is from 0.9:1 to 1:1. In a specific embodiment, the molar ratio of the tetracarboxylic dianhydride monomer to the diamine monomer is about 0.98:1.

The diamine monomer mentioned above may for example be 1,4 diamino benzene, 1,3 diamino benzene, 4,4'-oxydianiline, 3,4'-oxydianiline, 4,4'-methylene dianiline, N,N'-Diphenylethylenediamine, diaminobenzophenone, diamino diphenyl sulfone, 1,5-naphenylene diamine, 4,4'-diamino diphenyl sulfide, 1,3-Bis(3-aminophenoxy)benzene, 1,4-Bis(4-aminophenoxy)benzene, 1,3-Bis(4-aminophenoxy)benzene, 2,2-Bis[4-(4-amino phenoxy)phenoxy]propane, 4,4'-bis-(4-aminophenoxy)biphenyl, 4,4'-bis-(3-aminophenoxy)biphenyl, 1,3-Bis(3-aminopropyl)-1,1,3,3-tetramethyldisiloxane, 1,3-Bis(3-aminopropyl)-1,1,3,3-tetraphenyldisiloxane, 1,3-Bis(aminopropyl)-dimethyldiphenyldisiloxane or a combination thereof.

The tetracarboxylic dianhydride monomer may for example be 1,2,4,5-benzene tetracarboxylic dianhydride, 3,3',4,4'-biphenyl tetracarboxylic dianhydride, 4,4'-oxydiphthalic anhydride, benzophenonetetracarboxylic dianhydride, 3,3',4,4'-diphenyl sulfonetetracarboxylic dianhydride, 1,2,5,6-naphthalene tetracarboxylic dianhydride, naphthalenetetracaboxylic dianhydride, bis(3,4-dicarboxyphenyl)dimethylsilane dianhydride, 1,3-bis(4'-phthalic anhydride)-tetramethyldisiloxane or a combination thereof.

In step 130, the polyamic acid mixture is coated on a substrate and then a drying process is performed to form a dried layer of polyamic acid mixture on the substrate. Any conventional coating technique can be applied to the present disclosure, and for example the polyamic acid mixture can be coated on a substrate such as a supporting steel strip or roller by a slit coating method or a die coating method so as to form a layer of polyamic acid mixture film. Afterwards, a drying process is performed to remove the solvent from the coated layer of the polyamic acid mixture. In one embodiment, the drying process can be performed in an environment at a temperature from about 120° C. to about 200° C. to form a dried layer of the polyamic acid mixture.

In step 140, the dried layer of polyamic acid mixture is separated from the substrate to form a polyamic acid mixture film material. The polyamic acid mixture film dried by step 130 has a certain mechanical strength and toughness, so that the polyamic acid mixture film can be stripped from the substrate to form the polyamic acid mixture film material.

It should be noted that instead of being attached or adhered on a metal sheet or a metal body, the stripped polyamic acid mixture film material exists as a bare sheet. In other words, the polyamic acid mixture film is not formed on another metal sheet. That is the method for forming the polyamic acid mixture film through steps 110 to 140 is different from the method for manufacturing a two-level flexible copper clad laminate (2L FCCL). In the 2L FCCL, the polyamic acid solution is applied on a copper foil and then dried. Therefore, the dried polyamic acid layer is adhered on the copper foil.

In step 150, the polyamic acid mixture film is uniaxially stretched and heated to convert the polyamic acid mixture film into a polyimide film having the inorganic particles. The step of heating the polyamic acid mixture film is used for performing an imidization reaction (or referred to as heating and ripening). In one embodiment, the polyamic acid mixture film may be heated in an environment at a temperature from about 270° C. to about 400° C.

The term "uniaxially stretched" means that a tensile stress is applied to the polyamic acid mixture film in a direction, and in a direction perpendicular to the direction of the tensile stress, substantially no stress is additionally applied to the polyamic acid mixture film. In one embodiment, the resulted polyamic acid mixture film is a long-strip shaped coiling tape, and in the heating and ripening step, the polyamic acid mixture film passes through a high-temperature furnace slowly. The direction of uniaxial stretching is parallel to the moving direction of the polyamic acid mixture film. That is, the uniaxial stretch direction is parallel to the long side direction of the polyamic acid mixture film.

As described in step 140, since the polyamic acid mixture film material exists as a bare sheet, the step 150 is performed in a condition that the polyamic acid mixture film is not adhered to or contact with any metal layer body.

The polyimide film manufactured according to the embodiments of the present disclosure can reduce the thermal expansion coefficient of the polyimide film on all directions and reduce the difference between thermal expansion coefficients on different directions. Furthermore, the Young's modulus and the dimensional stability can be increased. In particular, in conventional techniques, when a bi-axial stretch technique is not used, the manufactured polyimide film has different thermal expansion coefficient values and Young's modulus on different directions (i.e., MD and TD). According to the embodiments of the present disclosure, the anisotropic of thermal expansion coefficient and Young's modulus of the polyimide film can be reduced or eliminated. Furthermore, the polyimide film manufactured according to the embodiments of the present disclosure has excellent mechanical properties, and the Young's modulus thereof may greater than 4 GPa. And the dimensional stability is excellent. In one embodiment, the inorganic particles in the polyimide film are existed at a concentration of 10-50% by weight of the polyimide film, and preferably 20-40%, and more preferably 25-38%. If the weight percentage of the inorganic particles in the polyimide film is greater than 50%, it is harmful to the mechanical property of the polyimide film. For example, embrittlement may happen to the polyimide film. In contrast, if the weight percentage of the inorganic particles is too low, for example lower than 10%, it is difficult to reduce the difference between the thermal expansion coefficients in two different directions as well as the difference between the mechanical strengths in two different directions.

Another aspect of the present disclosure provides a polyimide film having inorganic particles. The polyimide film is manufactured by a method described in any of the embodiments described above, the polyimide film is characterized in that the thermal expansion coefficient is equal to or less than 30 ppm/° C. in any direction, 1. The difference between two thermal expansion coefficients in two mutually perpendicular directions on the film surface is equal to or less than 10 ppm/° C., and the Young's modulus of the polyimide film is greater than 4 GPa in any direction. The dimensional stability of the manufactured polyimide film is less than 0.10% in any direction. Here the "dimensional stability" is measured by the standard of IPC-TM-650 unless illustrated or stated otherwise.

A further aspect of the present disclosure provides a polyimide film having inorganic particles. The polyimide film includes about 50-90 weight parts of polyimide and about 10-50 weight parts of the inorganic particles. The particle size of each of the inorganic particles is about 0.5 μm to about 5 μm. The polyimide film is characterized in that the thermal expansion coefficient is equal to or less than 30 ppm/° C. in any direction on the film surface, the difference between two thermal expansion coefficients in two mutually perpendicular directions on the film surface is less than 10 ppm/° C., and the Young's modulus of the polyimide film is greater than 4 GPa in any direction. The dimensional stability of the resulted polyimide film measured by the standard of IPC-TM-650 is less than 0.10% in any direction. In one embodiment, the particle size of each of the inorganic particles is about 0.5 μm to about 3 μm. The weight percentage of the inorganic particles in the polyimide film is about 25% to about 38% of the total weight of the polyimide film.

Yet a further aspect of the present disclosure provides a polyimide film having inorganic particles. The polyimide film does not contact with any metal layer body, and essentially consists of the following substances: about 50 to about 90 weight parts of polyimide; and about 10 to about 50 weight parts of inorganic particles. The particle size of each of the inorganic particles is about 0.1 μm to about 5 μm.

Embodiments

The following embodiments are used for illustrating specific aspects of the present disclosure in details, so that those of ordinary skills in the art of the present disclosure can implement the present disclosure. The following embodiments are not intended to limit the present disclosure.

COMPARATIVE EXAMPLE 1

9.62 Kg 4,4'-Diamino diphenyl ether (ODA) was added into a solvent of 80 Kg Dimethylacetamide (DMAC) and then the ODA was dissolved by stirring. Afterwards, 10.38 Kg Pyromellitic dianhydride (PDMA) was added and stirred for 6 h to perform a polymerization reaction and thus obtain a polyamic acid solution. The temperature of the above polymerization reaction was controlled at 20-30° C.

The resulted polyamic acid solution was coated on a supporting steel strip. Subsequently, the coated polyamic acid solution was dried at a temperature of 150° C. to form a polyamic acid layer on the supporting steel strip. Afterwards, the polyamic acid layer was stripped from the supporting steel strip to obtain a polyamic acid film. In this step, the polyamic acid film was shaped as a long strip, and the broad width thereof was about 75 centimeters.

Figure 2:
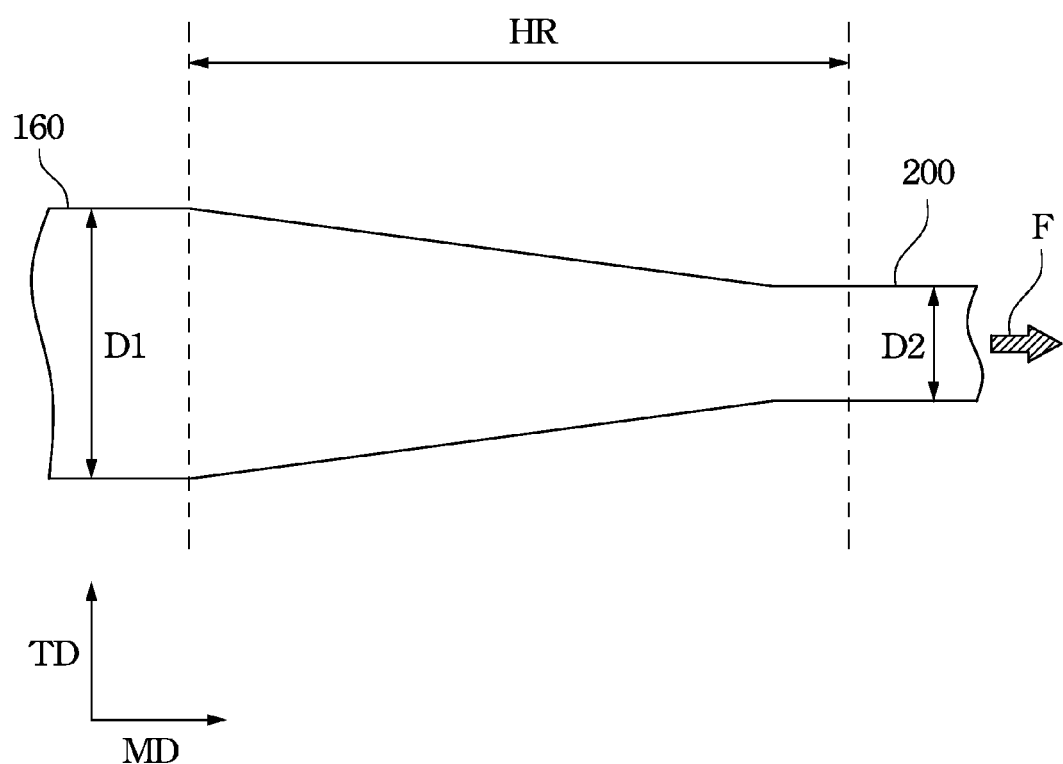
FIG. 2 illustrates a schematic top view of the heating and ripening step of the comparative example 1.

Thereafter, under the uniaxial stretch state of the polyamic acid film, the polyamic acid film was introduced into a high-temperature furnace with a temperature of 300° C. for heating and ripening (i.e., imidization), so as to obtain a polyimide film. Referring to FIG. 2, it illustrates a schematic top view of the heating and ripening step. In this step, the long-strip shaped polyamic acid film 160 moves toward the direction of an arrow F slowly in the high-temperature furnace, and the heating area in the high-temperature furnace was marked as HR. When the step of heating and ripening was completed (i.e., the film layer has left the heating area HR of the high-temperature furnace), the polyamic acid film 160 was converted into a polyimide film 200. In this comparative example, the uniaxial stretch direction was marked as MD. That is, the uniaxial stretch direction MD was parallel to the moving direction F of the polyamic acid film 160. In other words, the uniaxial stretch direction MD was parallel to the long side direction of the polyamic acid film 160. In the comparative example 1, the polyamic acid film 160 shrinks at a direction TD perpendicular to the direction MD during heating and ripening. As shown in FIG. 2, before entering the high-temperature furnace, the broad width D1 of the polyamic acid film 160 was about 75 centimeters. After the heating and ripening step was completed, the broad width D2 of the polyimide film was only about 60 centimeters. In this comparative example, the resulted polyimide film 200 was about 50 μm in thickness.

Due to the shrink at the TD direction, the thermal expansion coefficient (CTE) of the polyimide film 200 was anisotropic. In the comparative example 1, the thermal expansion coefficient of the resulted polyimide film 200 at the MD direction was 37 ppm/° C., and the thermal expansion coefficient thereof at the TD direction was 56 ppm/° C. In the comparative example 1, the resulted polyimide film has a too high thermal expansion coefficient both at MD and TD directions, which does not comply with the requirements of the industry.

Furthermore, in the comparative example 1 the Young's modulus of the resulted polyimide film 200 at the MD direction was 3.1 GPa, and the Young's modulus thereof at the TD direction was 2.9 GPa, so that the Young's modulus of the resulted polyimide film 200 was too low.

In the comparative example 1, the dimensional stability of the polyimide film at the MD direction was 0.12%, and the dimensional stability thereof at the TD direction was 0.05%. According to the standard of IPC-TM-650, the smaller the dimensional stability is, the better the dimensional stability is. Therefore, the dimensional stability of the comparative example 1 was not expected.

COMPARATIVE EXAMPLE 2

In this comparative example it was attempted to change the monomer component, so as to improve the thermal expansion coefficient and mechanical property of the polyimide film in the comparative example 1. The steps are illustrated in details as follows. 5.41 Kg ODA and 2.92 Kg para-phenylene diamine (PPDA) were added into a solvent of 80 Kg DMAC, and then the ODA and PPDA were dissolved by stirring. Afterwards, 11.67 Kg Pyromellitic dianhydride (PDMA) was added and stirred for 6 h to perform a polymerization reaction and thus obtain a polyamic acid solution. The temperature of the above reaction was controlled at 20-30° C. The subsequent steps were the same as the comparative example 1.

In the comparative example 2, the resulted polyamic acid film also shrinks at the direction TD during heating and ripening. Before entering the high-temperature furnace, the broad width D1 of the polyamic acid film 160 was about 75 centimeters. After the heating and ripening step was completed, the broad width D2 of the polyimide film was only about 60 centimeters. The polyimide film 200 was about 50 μm in thickness.

In the comparative example 2, the thermal expansion coefficient of the resulted polyimide film at the MD direction was 19 ppm/° C., which was close to the industry requirement of 17 ppm/° C. However, the thermal expansion coefficient of the resulted polyimide film at the TD direction was 46 ppm/° C., which was too greater than the industry requirement.

In the comparative example 2 the Young's modulus of the resulted polyimide film at the MD direction was 3.3 GPa, and the Young's modulus thereof at the TD direction was 2.9 GPa, so that the Young's modulus of the resulted polyimide film 200 in this comparative example was too low.

In the comparative example 2, the dimensional stability of the polyimide film at the MD direction was 0.10%, and the dimensional stability thereof at the TD direction was 0.05%. The dimensional stability was still not expected.

COMPARATIVE EXAMPLE 3

Figure 3:
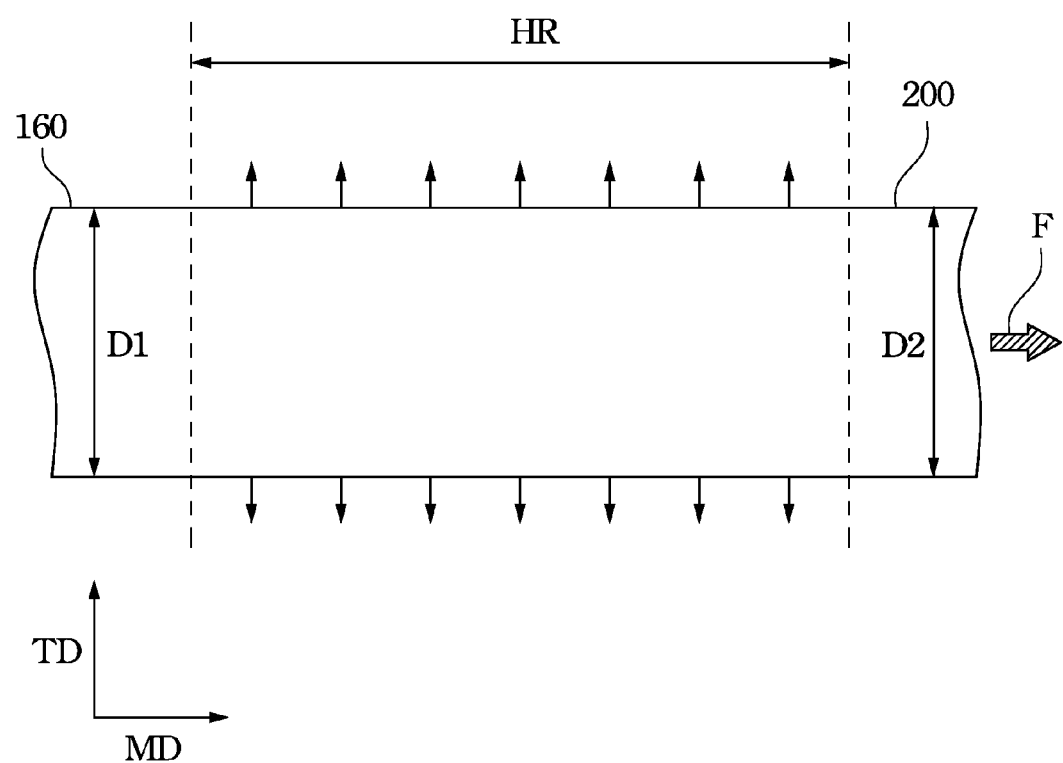
FIG. 3 illustrates a schematic top view of the heating and ripening step of the comparative example 3.
Figure 4:
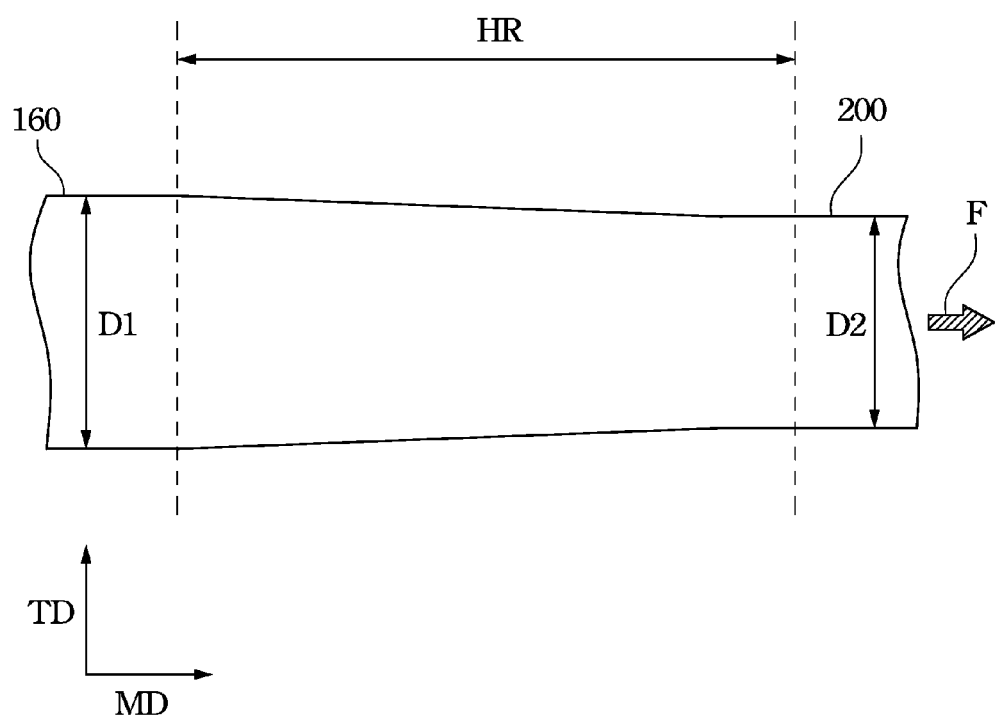
FIG. 4 illustrates a schematic top view of a heating and ripening step according to an embodiment of the present disclosure.

In this comparative example, a bi-axial stretch method was used for manufacturing the polyimide film. The steps for producing the polyamic acid solution in the comparative example 3 was the same as the comparative example 2, and the polyamic acid solution was shaped as a long strip polyamic acid film through the same manner as the comparative example 2. However, during heating and ripening, stresses were applied both at MD and TD directions, so as to avoid that the polyamic acid film shrinks at the TD direction during heating and ripening, as shown in FIG. 3. In this comparative example, before entering the high-temperature furnace, the broad width D1 of the polyamic acid film 160 was about 75 centimeters. After the heating and ripening step was completed, the broad width D2 of the polyimide film was still about 75 centimeters. The polyimide film 200 was about 50 μm in thickness.

In the comparative example 3, the thermal expansion coefficient of the resulted polyimide film 200 at the MD direction was 19 ppm/° C., and the thermal expansion coefficient thereof at the TD direction was also 19 ppm/° C. Both the two thermal expansion coefficients were close to the industry requirement of 17 ppm/° C. In the comparative example 3 the Young's modulus of the resulted polyimide film at the MD direction was 3.3 GPa, and the Young's modulus thereof at the TD direction was 3.3 GPa. The dimensional stability of the polyimide film at the MD direction was 0.05%, and the dimensional stability thereof at the TD direction was also 0.05%.

It can be seen from the above comparative example 3 that the bi-axial stretch method can effectively reduce the difference of the thermal expansion coefficients and dimensional stability of the polyimide film at the MD and TD directions. However, the bi-axial stretch equipment for volume production is very expensive due to the complicated structure design thereof. Moreover, due to the complicated structure design, the maintain cost is high.

Embodiment 1

6.98 Kg silicon dioxide powder was added into a solvent of 79.07 Kg Dimethylacetamide (DMAC) with continuous stirring to make the silicon dioxide powder suspend in the DMAC solvent. The particle size of the above silicon dioxide powder was about 1-3 μm. Thereafter, 6.71 Kg ODA was added and dissolved. Afterwards, PDMA was slowly added and stirred for 6 h to perform a polymerization reaction and thus obtaining a polyamic acid solution. The temperature of the above reaction was controlled at 20-30° C.

It should be noted that since the polymerization reaction was performed with continuous stirring, the silicon dioxide powder was evenly distributed in the polyamic acid solution instead of being precipitated. After the polymerization reaction was completed, the polyamic acid solution has a certain viscosity, so that even when the stirring was stopped, the silicon dioxide powder was not precipitated in a short time by gravity. Furthermore, since in this embodiment, silicon dioxide powder with a particle size in the micron order was used, the silicon dioxide powder can be evenly distributed in the polyamic acid solution through simply stirring. If nanoscale silicon dioxide particles with a particle size less than 100 nm were used, since the particle size was too small, agglutination may be easily happened among adjacent particles, and the dispersivity was far below that of the silicon dioxide in the micron order.

The obtained polyamic acid solution containing the silicon dioxide powder was coated on the supporting steel strip. Subsequently, the polyamic acid solution was dried at a temperature of 150° C. to form a polyamic acid layer containing the silicon dioxide powder. Afterwards, the polyamic acid layer was stripped from the supporting steel strip to obtain a polyamic acid film.

Thereafter, the polyamic acid film was uniaxially stretched and was introduced into a high-temperature furnace at a temperature of 300° C. for heating and ripening, to obtain the polyimide film, as shown in FIG. 3. In this step, the long-strip shaped polyamic acid film 160 moves toward the direction of the arrow F slowly in the high-temperature furnace, and the heating area of the high-temperature furnace was marked as HR. After the heating and ripening step was completed, the polyamic acid film 160 was converted into the polyimide film 200. In this embodiment, the direction of the uniaxial stretch MD was parallel to the moving direction F of the polyamic acid film 160. In other words, the direction of the uniaxial stretch MD was parallel to the long-side direction of the polyamic acid film 160. In the embodiment 1, the polyamic acid film 160 shrunk only a little at the TD direction during heating and ripening. Before entering the high-temperature furnace, the broad width D1 of the polyamic acid film 160 was about 75 centimeters. After the heating and ripening step was completed, the broad width D2 of the polyimide film was about 72 centimeters. The polyimide film 200 was about 50 µm in thickness. In this embodiment, the weight percentage of the silicon dioxide powder in the polyimide film was about 33.3%.

In the embodiment 1, the thermal expansion coefficient of the resulted polyimide film at the MD direction was 15 ppm/° C., and the thermal expansion coefficient thereof at the TD direction was 18 ppm/° C. In this embodiment, the thermal expansion coefficients of the resulted polyimide film at the MD and TD directions were both close to the industry requirement of 17 ppm/° C. Adding silicon dioxide powder into the polyimide film can effectively reduce the anisotropic of the CTE.

Furthermore, in the embodiment 1 the Young's modulus of the resulted polyimide film at the MD direction was 7.0 GPa, and the Young's modulus thereof at the TD direction was also 7.0 GPa. The Young's modulus was greatly increased, so that the polyimide film has an excellent mechanical property.

In the embodiment 1, the dimensional stability of the polyimide film at the MD direction was 0.02%, and the dimensional stability thereof at the TD direction was also 0.02%. Thus the dimensional stability was preferred than that of the comparative examples 1-3.

Embodiment 2

Compared with the embodiment 1, this embodiment mainly changes the adding amount of the silicon dioxide powder. The steps are illustrated in details as follows. 5.66 Kg silicon dioxide powder was added into a solvent of 80.19 Kg DMAC with continuous stirring to make the silicon dioxide powder suspend in the DMAC solvent. The particle size of the above silicon dioxide powder was about 1-3 µm. Thereafter, 6.81 Kg ODA was added and dissolved. Afterwards, PDMA was slowly added and stirred for 6 h to perform a polymerization reaction and thus obtained a polyamic acid solution. The temperature of the above reaction was controlled at 20-30° C. The subsequent steps are the same as these described in embodiment 1. In this embodiment, the weight percentage of the silicon dioxide powder in the polyimide film was about 28.6%.

In the embodiment 2, the resulted polyimide film was about 50 µm in thickness. The thermal expansion coefficient of the resulted polyimide film at the MD direction was 21 ppm/° C. and the thermal expansion coefficient thereof at the TD direction was 26 ppm/° C. In this embodiment, the thermal expansion coefficients of the resulted polyimide film at the MD and TD directions were both slightly higher than the industry requirement of 17 ppm/° C. The content of silicon dioxide powder in the polyimide film directly affects the thermal expansion coefficient and isotropic of the polyimide film.

Furthermore, in the embodiment 2 the Young's modulus of the resulted polyimide film at the MD direction was 6.2 GPa, and the Young's modulus thereof at the TD direction was 6.0 GPa. The Young's modulus of the resulted polyimide film in the embodiment 2 was slightly lower than that of the embodiment 1. The content of silicon dioxide powder in the polyimide film also affects the Young's modulus of the polyimide film.

In the embodiment 2, the dimensional stability of the polyimide film at the MD direction was 0.04%, and the dimensional stability thereof at the TD direction was also 0.04%. Thus the dimensional stability was also preferred than that of the comparative examples 1-3.

Embodiment 3

Compared with the embodiment 1, this embodiment mainly changes the monomer component and the adding amount of the silicon dioxide powder. The steps are illustrated in details as follows. 6.32 Kg silicon dioxide powder was added into a solvent of 79.63 Kg DMAC with continuous stirring to make the silicon dioxide powder suspend in the DMAC solvent. The particle size of the silicon dioxide powder was about 1-3 µm. Thereafter, 4.45 Kg ODA and 1.60 Kg PPDA were added with stirring to dissolve the ODA and the PPDA. Afterwards, 10.38 Kg PDMA was added and stirred for 6 h to perform a polymerization reaction and thus obtain a polyamic acid solution. The temperature of the reaction was controlled at 20-30° C. The subsequent steps are the same as the embodiment 1. In this embodiment, the weight percentage of the silicon dioxide powder in the polyimide film was about 31%. In the embodiment 3, the resulted polyimide film was about 50 µm in thickness. The thermal expansion coefficient of the resulted polyimide film at the MD direction was 17 ppm/° C., and the thermal expansion coefficient thereof at the TD direction was 19 ppm/° C. In this embodiment, the thermal expansion coefficients of the resulted polyimide film at the MD and TD directions were both close to the industry requirement of 17 ppm/° C.

Furthermore, in the embodiment 3 the Young's modulus of the resulted polyimide film at the MD direction was 6.4 GPa, and the Young's modulus thereof at the TD direction was also 6.4 GPa. The Young's modulus of the resulted polyimide film in the embodiment 3 was slightly lower than that of the embodiment 1.

In the embodiment 3, the dimensional stability of the polyimide film at the MD direction was 0.02%, and the dimensional stability thereof at the TD direction was also 0.02%. Thus the dimensional stability was also preferred than that of the comparative examples 1-3.

Embodiment 4

The method for manufacturing the polyimide film in this embodiment was substantially the same as that of the embodiment 1, except that the silicon dioxide powder was replaced by the talcum powder, and the talcum powder of this embodiment was about 125 µm in thickness.

In the embodiment 4, the thermal expansion coefficient of the resulted polyimide film at the MD direction was 21 ppm/° C., and the thermal expansion coefficient thereof at the TD direction was 23 ppm/° C. The Young's modulus at the MD direction was 5.0 GPa, and the Young's modulus at the TD direction was also 5.0 GPa. The dimensional stability of the polyimide film at the MD direction was 0.02%, and the dimensional stability thereof at the TD direction was also 0.02%.

Embodiment 5

The method for manufacturing the polyimide film in this embodiment was substantially the same as that of the embodiment 1, except that the silicon dioxide powder was replaced by the talcum powder, and the talcum powder of this embodiment was about 175 μm in thickness.

In the embodiment 5, the thermal expansion coefficient of the resulted polyimide film at the MD direction was 21 ppm/° C., and the thermal expansion coefficient thereof at the TD direction was 23 ppm/° C. The Young's modulus at the MD direction was 4.8 GPa, and the Young's modulus at the TD direction was also 4.8 GPa. The dimensional stability of the polyimide film at the MD direction was 0.02%, and the dimensional stability thereof at the TD direction was also 0.02%.

In the present disclosure, addictives of nanoscale inorganic particles with a particle size less than 0.1 μm is excluded. Those of skills in the art are confused by the effect of the nano techniques. Through research, the inventor of the present disclosure finds that although nanoscale inorganic particles (such as inorganic particles with a particle size less than 100 nm) added in the polyimide film can increase the mechanical strength of the polyimide film, since the particle size is too small, it is necessary to use additional distribution technology to distribute these nano particles in the reaction system. Moreover, even when the advanced distribution technology is applied, the adding amount of the nanoscale inorganic particles hardly exceeds 10% of the total weight of the polyimide film. Because when the adding amount of the nanoscale inorganic particles is too high, it is easy to cause particle agglutination. Generally, the added nanoscale inorganic particles are only 2-6% of the total weight of the polyimide film. When the content of the nanoscale inorganic particles is not high, a shrink of the film layer still happens during the step of heating and ripening. Thus the thermal expansion coefficient of the resulted polyimide film is still anisotropic. It is necessary to use a bi-axial stretch technique for manufacturing in order to reduce the anisotropic of the thermal expansion coefficient In the present disclosure, the polyimide film is manufactured through a uniaxial stretch method. According to the embodiments of the present disclosure, when inorganic particles with a particle size greater than 0.1 μm are used, the particle agglutination problem is not very serious, and the distribution effect can be achieved through simply stirring. The content of the inorganic particles in the polyimide film can be increased to about 45% of the total weight of the polyimide film. Therefore, manufacturing the polyimide film only through the uniaxial stretch method can achieve substantially isotropic of the thermal expansion coefficient and mechanical strength of the resulted polyimide film.

According to an embodiment of the present disclosure, the resulted polyimide film exists as a bare sheet, instead of being pasted to a metal layer body. In the 2L FCCL, the polyamic acid solution is applied on a copper foil and then dried, heated and ripened. In this process, the polyimide film is heated and ripened while being pasted to the copper foil, which is different from the condition of the present disclosure, so that it needs to consider neither uniaxial stretch nor bi-axial stretch.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A method for manufacturing a polyimide film having inorganic particles and with a thickness of about 12 μm to about 250 μm, the method comprising:

(a) mixing a plurality of inorganic particles with a solvent, and stirring the inorganic particles and the solvent to form a suspending liquid, wherein each of the inorganic particles has a particle size of about 0.1 μm to about 5 μm;

(b) mixing and stirring a diamine monomer and a tetracarboxylic dianhydride monomer with the suspending liquid to polymerize the diamine monomer and the tetracarboxylic dianhydride monomer, and thus forming a polyamic acid mixture containing the inorganic particles;

(c) coating the polyamic acid mixture on a substrate and then performing a drying process to form a dried layer of polyamic acid mixture on the substrate;

(d) separating the dried layer of polyamic acid mixture from the substrate to form a polyamic acid mixture film; and (e) uniaxially stretching and heating the polyamic acid mixture film simultaneously to convert the polyamic acid mixture film into the polyimide film.

2. The method of claim 1, wherein the particle size of the step (a) is about 0.5 μm to about 3 μm.

3. The method of claim 1, wherein the inorganic particles of the step (b) are selected from the group consisting of mica powder, silicon dioxide powder, talcum powder, ceramic powder, clay powder, kaolinite clay and a combination thereof.

4. The method of claim 1, wherein the solvent of the step (a) is selected from the group consisting of N,N-Dimethyl formamide (DMF), Dimethylacetamide (DMAc), Dimethyl sulfoxide (DMSO), N-methyl-2-pyrrolidone (NMP) and a combination thereof.

5. The method of claim 1, wherein the step (b) comprises:
adding the diamine monomer into the suspending liquid and dissolving the diamine monomer to form a mixture containing the diamine monomer; and
adding the tetracarboxylic dianhydride monomer into the mixture containing the diamine monomer.

6. The method of claim 1, wherein the stirring in the step (b) is carried out for about 4 hours to about 36 hours.

7. The method of claim 1, wherein a molar ratio of the tetracarboxylic dianhydride monomer to the diamine monomer of the step (b) is 0.9:1 to 1.1:1.

8. The method of claim 1, wherein a viscosity of the polyamic acid mixture of the step (b) is about 100 poises to about 1000 poises.

9. The method of claim 1, wherein the diamine monomer of the step (b) is selected from the group consisting of 1,4 diamino benzene, 1,3 diamino benzene, 4,4'-oxydianiline, 3,4'-oxydianiline, 4,4'-methylene dianiline, N,N'-Diphenylethylenediamine, diaminobenzophenone, diamino diphenyl sulfone, 1,5-naphenylene diamine, 4,4'-diamino diphenyl sulfide, 1,3-bis(3-aminophenoxy)benzene, 1,4-bis(4-aminophenoxy)benzene, 1,3-bis(4-aminophenoxy)benzene, 2,2-bis[4-(4-amino phenoxy)phenoxy]propane, 4,4'-bis-(4-aminophenoxy)biphenyl, 4,4'-bis-(3-aminophenoxy)biphenyl, 1,3-bis(3-aminopropyl)-1,1,3,3-tetramethyldisiloxane, 1,3-bis(3-aminopropyl)-1,1,3,3-tetraphenyldisiloxane, 1,3-bis(aminopropyl)-dimethyldiphenyldisiloxane and a combination thereof.

10. The method of claim 1, the tetracarboxylic dianhydride monomer of the step (b) is selected from the group consisting of 1,2,4,5-benzene tetracarboxylic dianhydride, 3,3',4,4'-biphenyl tetracarboxylic dianhydride, 4,4'-oxydiphthalic anhydride, benzophenonetetracarboxylic dianhydride, 3,3',4,4'-diphenyl sulfonetetracarboxylic dianhydride, 1,2,5,6-naphthalene tetracarboxylic dianhydride, naphthalenetetracarboxylic dianhydride, bis(3,4-dicarboxyphenyl)dimethylsilane dianhydride, 1,3-bis(4'-phthalic anhydride) -tetramethyldisiloxane and a combination thereof.

11. The method of claim 1, wherein the drying process of the step (c) is performed in an environment at a temperature of about 120° C. to about 200° C.

12. The method of claim 1, wherein the act of heating the polyamic acid mixture film in the step (e) is performed in an environment at a temperature from about 270° C. to about 400° C.

13. The method of claim 1, wherein the uniaxially stretching is performed in a direction parallel to a long side of the polyamic acid mixture film.

14. The method of claim 1, wherein the step (e) is performed in the condition that the polyamic acid mixture film is not in contact with any metal layer.

15. The method of claim 1, wherein the inorganic particles are existed in a concentration of 10-50% by weight of the polyimide film.

* * * * *